Jan. 13, 1953  W. KRANZ  2,625,414
SEALING ELEMENT FOR PRESSURE VESSELS
Filed Dec. 18, 1948
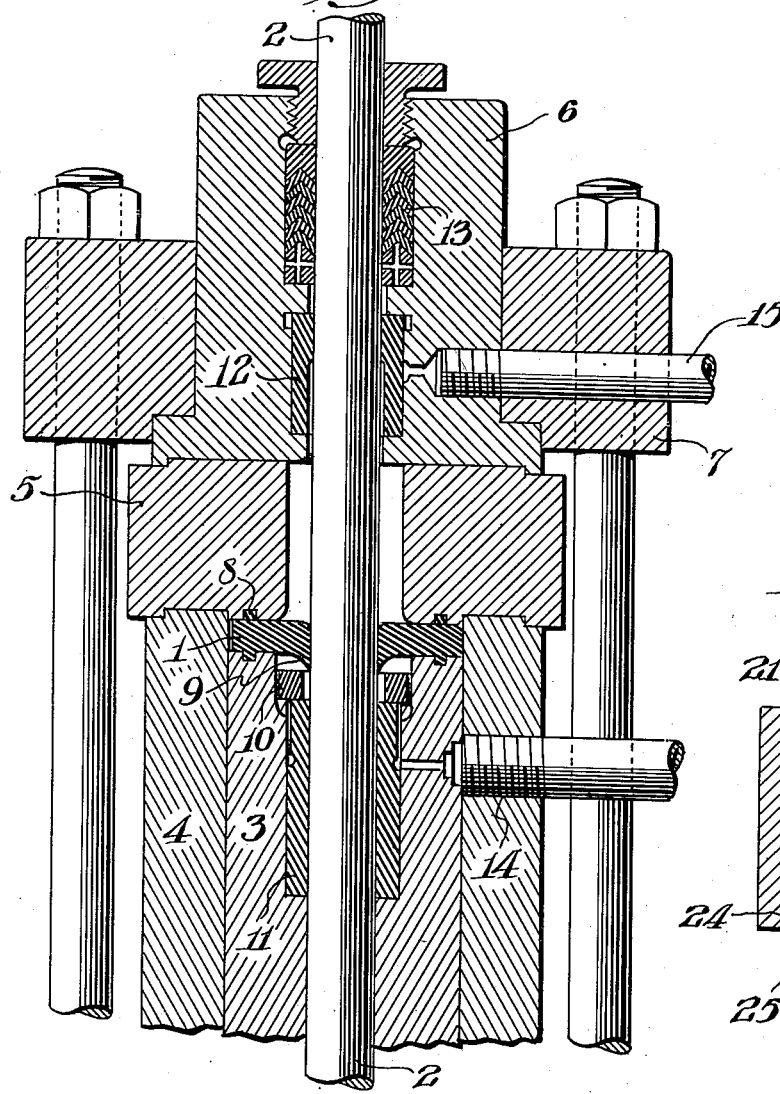
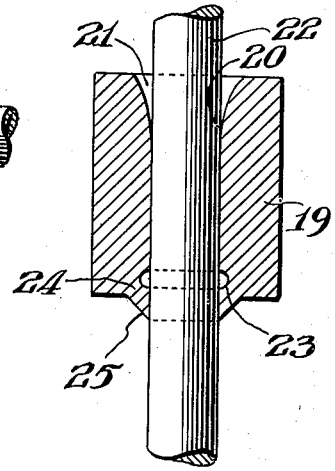
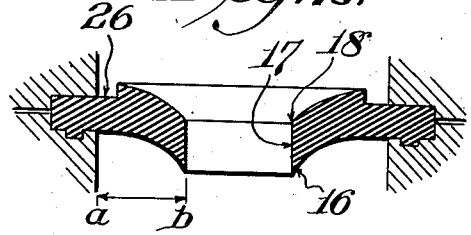
INVENTOR.
WILLIAM KRANZ
BY
A. McAlevy
ATTORNEY Patented Jan. 13, 1953

2,625,414

UNITED STATES PATENT OFFICE 2,625,414

SEALING ELEMENT FOR PRESSURE VESSELS

William Kranz, Kennett Square, Pa., assignor to E. I. du Pont de Nemours & Company, Wilmington, Del., a corporation of Delaware Application December 18, 1948, Serial No. 66,068

3 Claims. (Cl. 286—26)

This invention relates to a method and apparatus for sealing a reciprocable and/or rotatable element, such as a reciprocable shaft, piston, or the like, mounted in a pressure vessel.

In the field of high-pressure technology, and more particularly in the field of high pressure chemical synthesis, one of the outstanding problems for many years has been to prevent the development of leaks in pressure-withholding equipment which contains moving elements which have to be sealed so as to withstand the high pressure differential between the inside and the outside of the pressured vessel. This problem has been especially acute and difficult in the field of high pressure chemical synthesis involving the use of corrosive materials at pressures as high as 10,000 pounds per square inch, and higher.

An object of this invention is to provide an improved sealing means for reciprocable elements and the like, which sealing means is effective for prolonged periods of use, even when the pressure differential across the packing element exceeds 10,000 pounds per square inch.

The invention is based in part upon the discovery that a packing element comprising a tight-fitting annular diaphragm, engaging a reciprocable element with a clearance not substantially in excess of 0.002, and preferably not in excess of 0.0008 inch, when subjected to a pressure differential of about 10,000 to 50,000 pounds per square inch, or higher, will retain these high pressures for unprecedently long periods of operation if the said diaphragm is so positioned and supported that it can flex to cause a contraction of its inside diameter, when subjected to the pressure differential. The present invention thus provides a packing element containing an annular diaphragm seal, and capable of withstanding pressures in excess of 10,000 pounds per square inch for prolonged periods of time.

Any suitable metal may be used as a material of construction for the annular diaphragms which are employed in the practice of the invention. Metals which may be employed satisfactorily include silver, bronze, beryllium-copper, monel, etc. It is, of course, quite essential that the clearance between the annular diaphragm and the shaft prior to applying the pressure differential be very carefully controlled. This clearance should be within the range of 0.002 to 0.0002 inch, and preferably within the range of 0.0005 to 0.0008 inch.

Any means for supporting the annular diaphragm which does not interfere with the axial flexure and proper alignment of diaphragm and plunger upon the application of pressure may be employed.

Figure 1 shows a cross-section view of a packing assembly employing a distortable diaphragm seal for a reciprocable shaft as explained in detail below. Figure 2 is a cross-section view of one form of the sealing member. Figure 3 is a cross-section view of another form of the sealing member.

For best results from the standpoint of long life and avoidance of excessive scoring of the reciprocable shaft, it is essential that the annular diaphragm be so shaped that its base (i. e., high pressure side) tapers towards the shaft in the direction of the pressure side of the packing element. This tapering extension of the diaphragm towards the shaft (cf. in Figure 2, the contour of the base 16 of the diaphragm as it approaches the bore 17 in the direction of the high pressure side of the seal makes for a longer-wearing seal.

Figure 1 represents a metallic annular diaphragm 1, closely engaging the shaft 2. The diaphragm is held in position by the supporting means 4, 5, 6 and 7, and by the gasket (made of fluoroethylene polymer or other elastomer-like material) 8, none of which supporting means, however, interfere with the slight axial flexure of the diaphragm (sufficient to close the clearance of about 0.0005 to 0.0008 inch between the diaphragm and the shaft) which occurs when a pressure differential of 10,000 to 50,000 pounds per square inch, or higher, is exerted across the packing element. The base, i. e. the pressure side, of the diaphragm contains an annular lip 9 concentric with the shaft and comprising a concentric surface of tapered contour extending to the bore. Other parts of the packing element shown in Figure 1 are the ring 10, the annular members 11 and stuffing box 13. Lubricating oil under pressure is supplied through suitable openings 14 and 15. It is to be understood, of course, that other methods for supplying lubricant may be employed; in particular, known methods which may be used for supplying lubricant to the pressure side of the diaphragm are especially effective in the practice of this invention.

Figure 2 shows another form of the annular ring diaphragm, with the tapering lip 16 on the high pressure side and a tapering annular bore 18 on the low pressure side. Except for this tapering of the bore on the low pressure side, the bore 17 is, of course, parallel with the shaft axis.

Figure 3 represents a packing element 19 having a tapering bore 20 on the low pressure side, thus forming, as described below, an "oil wedge" 21 of the lubricant which is interposed between the element 19 and the reciprocable shaft 22. If this element is used in combination with a pressure vessel equipped with inlet and outlet valves, the downward stroke of the reciprocable member 22 can produce a discharge of the contents of the vessel at very high pressure. An annular groove 23 is cut in the bottom of the element 19 so that if the pressure on the discharge stroke is higher than the lubricant pressure built up by wedge action, some flexing of the diaphragm, or thin section 24 occurs, which causes deflection of the lip 25, resulting in contact with the reciprocable member 22. It is to be understood that this deflection occurs preferably at very high pressures, e. g. at pressures of 10,000 to 50,000 pounds per square inch.

The "wedge action" referred to in the preceding paragraph is described in detail in the Coopey Patent U. S. 2,369,883. The "wedge action" disclosed in U. S. 2,369,883, depends for its effect upon the building up of a high pressure oil film by the stroke of the shaft in the direction of the tapering of the bore, due to the fact that the oil adhering to the shaft is forced, by the movement of the shaft, into a zone in which the clearance between the shaft and the packing element becomes progressively smaller during the stroke. The present invention does not rely exclusively upon this wedge action, but is based upon an entirely different principle, i. e. the distortion of the tight fitting ring seal at very high pressures.

The packing element in U. S. 2,369,883, remains relatively rigid during each stroke of the plunger or shaft, and no significant deflection of the sealing element occurs. In contrast with this, the sealing element of the present invention is capable of being deflected when subjected to a pressure of 10,000 pounds per square inch, or higher. Such deflection is readily obtainable, for example, when the portion of the diphragm subjected to distortion is not less than about one half as narrow, in the radial dimension, as the minimum thickness of the diaphragm within the said portion. Thus, in Figure 2 the portion of the diaphragm which is subjected to distortion is represented by ab. The length of this portion in the radial dimension is ab, which is not less than one half as short as the minimum thickness within the said portion, namely the thickness at the point 26.

The sealing element described herein is highly useful in pumping or pressuring fluids at pressures of about 10,000 pounds per square inch and higher. In practical tests carried out with large scale equipment (commercial size), this diaphragm packing has been used in pumping propionic acid (a corrosive chemical, which gives very considerable trouble with ordinary packing elements even at low pressure), at a pressure of 10,000 pounds per square inch for a period of 2170 hours. This is a 5 to 6 fold increase in packing life over the longest life obtainable with the very best of the previously known sealing devices used in this service. Similar long packing life has been noted, in the practice of the invention, in pumping such gases as ethylene at pressures of 20,000 pounds per square inch, a result which is unprecedented, and not heretofore considered attainable on an industrial scale, in the field of high pressure chemical technology.

Since many apparently widely differing embodiments will occur to one skilled in the art, it is obvious that various changes and modifications can be made in the detailed construction and practice of the present invention without departing from the spirit and scope thereof.

I claim:

1. A packing device for sealing a reciprocable shaft in a pressure vessel which comprises the combination of a reciprocable shaft, positioned in the bore of an annular metallic diaphragm, said bore being concentric with the shaft and comprising a concentric surface of tapered contour, said diaphragm being mounted in sealing relationship to a pressure vessel and separating the pressure chamber thereof from a surrounding external zone of lower pressure, said diaphragm in its undistorted state being separated from the reciprocable element by a radial clearance of 0.0002 to 0.0008 inch, the surface of the said diaphragm adjacent to the shaft engaging the shaft more closely by axial flexure of the said diaphragm, produced by a differential pressure within the range of 10,000 to 50,000 pounds per square inch across the diaphragm in the axial direction, said pressure being exerted against the base of the said diaphragm by the contents of the pressure chamber, the direction of diminishing radius in the taper of the the said bore being twoards the high pressure side of the seal.

2. The device set forth in claim 1 in which the said diaphragm contains a lip adjacent to the reciprocable shaft on the high pressure side, said lip tapering towards the said reciprocable element.

3. The device set forth in claim 1 in which the portion of the diaphragm subjected to distortion is not less than about one-half as narrow in the radial dimension, as the minimum thickness of the diaphragm within the said portion.

WILLIAM KRANZ.

REFERENCES CITED

The following references are of record in the file of this patent:

UNITED STATES PATENTS

| Number | Name | Date |
|---|---|---|
| 1,715,944 | Oliver | June 5, 1929 |
| 2,350,123 | Mercier | May 30, 1944 |
| 2,369,883 | Coopey | Feb. 20, 1945 |
| 2,402,114 | Le Clair | June 11, 1946 |

FOREIGN PATENTS

| Number | Country | Date |
|---|---|---|
| 182,147 | Switzerland | of 1936 |